June 12, 1923.
A. O. HENDERSHOTT
NUT LOCK
Filed Nov. 4, 1921
1,458,340
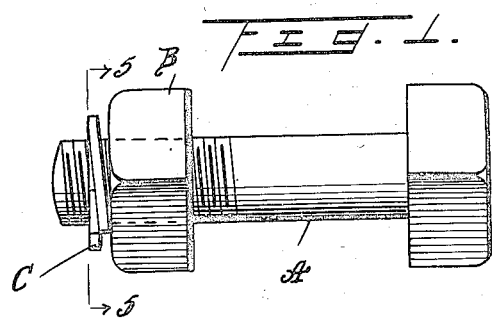
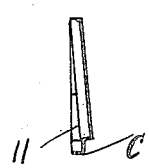
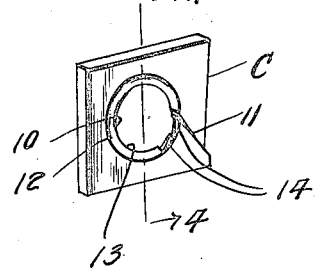
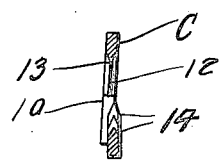
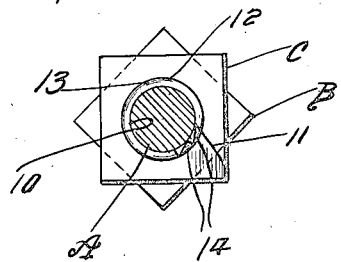
Inventor
A. O. Hendershott.
By
Attorney Patented June 12, 1923.

1,458,340

UNITED STATES PATENT OFFICE.

ALVIN O. HENDERSHOTT, OF KEOKUK, IOWA.

NUT LOCK.

Application filed November 4, 1921. Serial No. 512,841.

*To all whom it may concern:*

Be it known that I, ALVIN O. HENDERSHOTT, a citizen of the United States, residing at Keokuk, in the county of Lee and State of Iowa, have invented certain new and useful Improvements in Nut Locks; and I do hereby declare the following to be a full, clear, and exact description of the invention, such as will enable others skilled in the art to which it appertains to make and use the same.

This invention relates to a lock to prevent loosening rotation of a nut from a bolt.

The main object is to provide a means for accomplishing the purpose mentioned which may be expeditiously and inexpensively made in a single piece.

Another object is to provide a lock movable on the thread of a bolt which is relatively thin and helical to conform to the thickness of the thread of the bolt.

A further object is to provide a helical lock of relatively thin material and which is resilient so as to be capable of following threads of different thicknesses, whereby a single nut may be used on bolts having screw threads of different thicknesses and the necessity of providing a plurality of screw threads on the lock is overcome.

Another object is to provide such a lock having one or more teeth that the thread-engaging portion of the bolt cooperates with in preventing removal or detachment.

Additional objects and advantages will become apparent from a consideration of the description following taken in connection with accompanying drawings illustrating one practical embodiment.

In said drawings:—

Figure 1 is an elevation of a bolt and stud with my improved lock thereon and in operative position;

Figure 2 is a side elevation of the lock;

Figure 3 is a perspective view of the lock;

Figure 4 is a cross sectional view on the line 4—4 of Figure 3, and

Figure 5 is a cross sectional view on the line 5—5 of Figure 1.

Like reference numerals designate like or similar parts through the different views.

To facilitate an understanding of the construction and operation of my improved lock, a bolt has been shown of which its screw threaded shank is designated A and receives a fastening nut at B. My lock cooperates with bolts and nuts in a general sense and is not used in connection therewith in any particular place or art.

The lock per se is preferably of metal and is generally designated C. This lock is split from a bore opening 10 on a diagonal line as at 11 and is preferably made from sheet metal into the form of a helix as shown. In practice this lock is made from material substantially one-sixteenth of an inch in thickness.

The lock at the bore opening is formed into a thread 12 and if desired may be beveled as at 13 from opposite sides. Said thread is suitably cut away to provide one or more at 14 to bite the threads of the shank at A when the lock is turned in a direction to remove it from said shank.

In use, the lock C, at its thread 12 is threaded on to the shank A and into contact with the nut D. Threading movement on to the shank A is not resisted due to the shape of the teeth at the bore opening but should it be endeavored to remove said lock C from the shank A, the teeth 14 will bite into the thread of said shank A and thus resist and prevent removal.

As the device is relatively thin and helical, the provision of a plurality of threads at the opening 10 is unnecessary as the article itself is formed substantially of the thickness of the thread at A. In addition, said article is of spring or bendable metal, which constitutes in effect a single thread, which may be readily distorted to engage threads of different thicknesses.

As merely one practical embodiment has been illustrated and described variations may be resorted to.

I claim as my invention:—

A nut lock comprising a relatively thin blank having a bolt-receiving bore, the edge of the lock in said bore being substantially helical and provided with a single thread to cooperate with an engaged screw thread, said blank being flexible whereby said thread may conform to bolt threads varying in thickness, the blank being split on a line from its bore to its outer edge, and said thread being cut away adjacent the split to provide a plurality of teeth to engage bolt threads and resist retrograde movement of the lock.

In testimony whereof I affix my signature in presence of two witnesses.

ALVIN O. HENDERSHOTT.

Witnesses:
HENRY S. WALKER,
W. B. KINNAMON.